United States Patent [19]

Lockhart

[11] Patent Number: 4,686,746

[45] Date of Patent: Aug. 18, 1987

[54] CHAIN SEPARATOR MEANS

[76] Inventor: Ronald R. Lockhart, 615 Colonel Dewees Rd., Wayne, Pa. 19087

[21] Appl. No.: 577,163

[22] Filed: Feb. 6, 1984

[51] Int. Cl.[4] .................. A44C 5/02; F16G 15/00
[52] U.S. Cl. .................. 24/116 R; 24/116 A; 24/237; 24/616; 63/20
[58] Field of Search ............ 24/573, 616, 237, 116 R, 24/116 A, 49 CF; 63/20, 21; 211/65

[56] References Cited

U.S. PATENT DOCUMENTS

| | | | |
|---|---|---|---|
| 1,059,520 | 4/1913 | Blomstrom | 24/116 R |
| 1,531,770 | 3/1925 | Walker | 24/116 R |
| 1,643,661 | 9/1927 | Kendall | 211/65 |
| 1,784,482 | 12/1930 | Crawford | 24/49 CF |
| 1,995,226 | 3/1935 | Reilly | 24/49 CF |
| 1,997,724 | 4/1935 | Franklin, Jr. | 24/573 |
| 2,038,448 | 4/1936 | Reilly | 24/49 CF |
| 2,521,589 | 9/1950 | Livingston | 63/20 |
| 2,586,758 | 2/1952 | Zerr | 24/116 R |
| 3,181,217 | 5/1965 | Bohlinger et al. | 24/116 A |
| 3,974,545 | 8/1976 | Lossini | 24/116 R |

FOREIGN PATENT DOCUMENTS 1248047 10/1960 France .................. 24/116 A

*Primary Examiner*—Victor N. Sakran
*Attorney, Agent, or Firm*—John S. Munday

[57] ABSTRACT

A device for separating at least two neck chains, each having at least one fixed ring thereon, comprising: a chain separator means including a pair of elongated members and a biasing means urging said elongated members in close substantially parallel relationship to each other; at least one of said elongated members having a plurality of first portions extending toward the other elongated member and a plurality of second portions alternatingly spaced between said first portions, said second portions each extending away from the other elongated member for a distance sufficient to accommodate one of said fixed rings on said neck chains.

14 Claims, 2 Drawing Figures

CHAIN SEPARATOR MEANS

BACKGROUND OF THE INVENTION

The use of decorative jewelry can be traced back in human history to before the time when any written records exist, and the variety of devices used as decorative jewelry is as great as humanity's imagination. One type of jewelry which has always been popular and in great demand is the neck chain. Neck chains can be as varied as flowered leis from the islands to heavy metal chain links to fine precious metal to string or cord to fine woven fibers, etc. There has been no limit to the imagination as humanity, both male and female have sought to use neck chains for adornment, for functional purposes such as badge holders, and for personality statements, both macho and delicate.

As is usual with human endeavor, if one thing works, then more than one seems to be even better. People have tried to wear two, or three or more neck chains at one time, since the first affluent user appeared.

In modern times, because of style trends and because precious metal has been said to be an inflation hedge, more and more individuals are wearing 2 or 3 neck chains. Some chains are fine, 14 or 18 carat gold, and others are plated heavier chains holding lockets, medalions and other symbols and jewelry.

As a result of the use of multiple neck chains, two problems are encountered which detract from the desirability and practicality of such a practice. First, most every chain has a built in ability to tangle and become ensnarled with any other chain used with it. As a person moves, the two chains will cross over each other, and the only way at present to prevent this entanglement is to behave as a mannequin, and not move. Second, every time a chain is tangled, stress is placed on the chain in a way other than that which it was designed to take. This is a particular problem with fine precious metal chains, which then break and can easily be lost.

Accordingly, it would be a great benefit to humanity if a device would be provided which would prevent neck chains from tangling when two or more are worn at one time. It would be particularly beneficial if this device would additionally prevent loss of chains that happen to break for whatever reason, and also if it would help to reduce to a minimum the wear and unintended stress on chains used together.

SUMMARY OF THE INVENTION

It has now been discovered that the above and other benefits can be achieved, using the device of this invention. Specifically, it has been discovered that two or more neck chains may be separated when worn at the same time when the device of this invention is employed.

The device is designed specifically for use with two or more neck chains, and particularly with those chains which have at least one fixed ring on the chain. The device normally will accomodate 3 or 4 chains, but two adjacent devices each accomodating several chains will also prevent those groups of chains from becoming tangled.

The chain separator means includes a pair of elongated members and a biasing means, at an end usually, urging the elongated members into close substantially parallel relationship with each other. In a preferred embodiment, the chain separator means is formed from one continuous piece of flexible material, such that it is bent to have an elongated U-shape.

At least one of the elongated members has a plurality of first portions extending toward the other member and has a plurality of second portions alternatingly spaced between the first portions. The second portions each extend away from the other elongated member for a distance sufficient to accomodate one of the chains being worn. Thus the one member takes on a wave shape with alternating portions close and apart from the other member, but it still maintains a general elongated shape parallel to the other member. The other member may be straight or waved.

BRIEF DESCRIPTION OF THE DRAWINGS

For a more complete understanding of the invention, reference is hereby made to the drawings, in which.

DESCRIPTION OF THE PREFERRED EMBODIMENT

Figure 2:
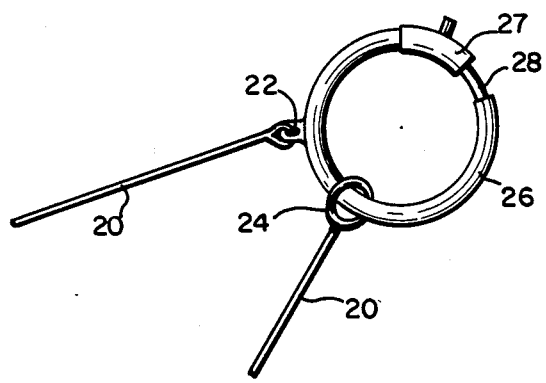
FIG. 2 is an elevational view of a complete ring cut away in FIG. 1.

As shown in FIG. 2, a conventional chain 20 is fixedly mounted by link 22 or ring 24 to the fixed ring 26. Spring ring clasp 27 moves the portion 28 inside of ring 26 to permit ring 24 to be placed over ring 26 to attach the chain 20 around the neck of the wearer. When one chain is worn, there is no problem, as long as all of the pieces are in good repair.

Figure 1:
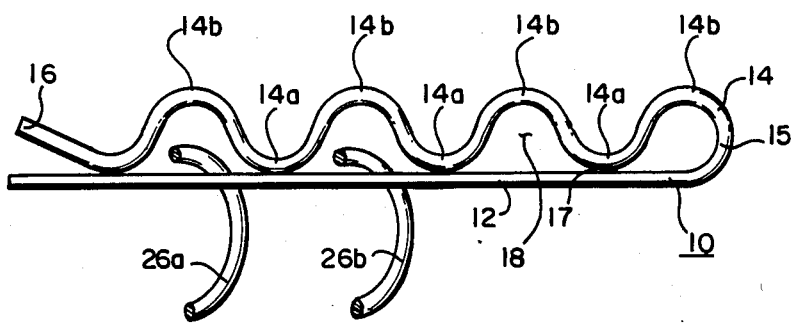
FIG. 1 is an elevational view of the preferred embodiment, with a pair of chain rings shown cut away.

When two or more chains are worn at one time, they will, as aforementioned, tangle and become intwined due to the motion of the wearer. To prevent this, the neck chain separator of this invention, shown generally by 10 in FIG. 1, will be used to separate and keep free from tangling the chains so that no unwanted stress or wear on the chain takes place.

The separator 10 includes a pair of elongated members 12 and 14, and a biasing means 15 which serves to urge the elongated members 12 and 14 into close substantially parallel relationship to each other. In this embodiment, the separator 10 is formed from a single piece of flexible material which has been bent to have elongated members 12 and 14, and U-shaped joint 15. Metal is a preferred material, and particularly preferred is jewelers brass. 20 gauge wire has been used with great success, since it is flexible enough to permit insertion into neck chain rings, and firm enough to hold the rings once they are in position. Plating with gold, silver or other precious metals is often desirable for decorative purposes or to insure allergy free use.

One of the elongated members 14 includes a plurality of first portions 14a which extend toward the other member 12, and a plurality of second portions 14b which are alternatingly spaced between first portions 14a and which extend away from elongated member 12.

The portions 14a, which extend toward member 12, are normally in light contact with member 12, so as to prevent chain movement through the gap 17. The portion 14b extends away from member 12 by an amount or distance 18 sufficient to permit a chain or fixed ring 26a or 26b to be inserted as shown. One end 16 of member 14 is divergent from the other member 12 at the end away from the biasing means 15 to permit easy separation of the members 12 and 14 when a ring 26a is added or removed.

As can be seen, each separate chain is held in its own area 18 defined by member 12 and second portion 14b. The narrow gap 17 at portion 14a (which may be in light contact with member 12) prevents the ring 26a from changing position with respect to ring 26b, and others.

It has been discovered based upon several tests that as long as the chains don't start to tangle at the neck, they will not tangle elsewhere. This is true because the chains cannot cross over when restrained by the separator 10. All that the wearer needs to do is reach around to the back, grasp the separator, and shake gently to separate the chains without tangles. The separator 10, because of its weight, does not migrate around the neck to the front, to become obvious to the observer, but it unobtrusively performs its function as described.

Of course, because chains do not become tangled, they are subjected to much less wear and damage. Also, because the separator 10 does hold the chain, and preferably a fixed ring on the chain, if the chain does break it will be held by separator 10 and not be lost. Similarly, since separator 10 is primarily serving to separate and not hold the chains on the neck, if the separator were to break, or be knocked off, the chains might tangle but would not be lost. Thus, the device serves as dual insurance to protect expensive chains and the like.

As described, the invention is shown to be of great value for use with neck chains. If is to be understood that bracelets worn on the wrist may also be used with the separator of this invention. Also, one might wish to carefully loop a very long chain into 2, 3 or more loops, and use of the separator described and claimed herein would be effective in maintaining position and preventing unnecessary tangling.

Having thus described the invention, what is claimed is:

1. A device for separating at least two chains, comprising a flexible single piece of: a chain separator means including a pair of elongated members and a biasing means urging said elongated members in close substantially parallel relationship to each other; at least one of said elongated members having a plurality of first portions extending toward the other elongated member and an plurality of second portions alternatingly spaced between said first portions, said second portions each extending away from the other elongated member for a distance sufficient to accomodate a ring of one of said neck chains.

2. The device of claim 1 wherein said chain separator means is formed from a single piece of flexible material bent to have an elongated U-shape, said material having sufficient flexibility to permit slight relative movement of said elongated members to permit insertion of several neck chains.

3. The device of claim 2 wherein said material is metal.

4. The device of claim 3 wherein said metal is jewelers brass.

5. The device of claim 4 wherein said brass is plated with a precious metal.

6. The device of claim 1 wherein both of said elongated members have alternating first and second portions.

7. The device of claim 6 wherein the first portions of each member are mutually aligned and the second portions of each member are mutually aligned.

8. The device of claim 1 wherein the number of portions is sufficient to accomodate 2, 3 or 4 neck chain fixed rings.

9. The device of claim 1 wherein first portions of said member normally are in light contact with the other elongated member.

10. The device of claim 1 wherein one of said elongated members is divergent from the other member at its end away from the biasing means.

11. A device for separating at least two neck chains, each having at least one fixed ring thereon, comprising: a chain separator means including a pair of elongated members and a biasing means formed from a single piece of flexible metal bent to have an elongated U-shape which urges the elongated members into close substantially parallel relationship to each other; at least one of said elongated members having a plurality of first portions extending toward the other elongated member and a plurality of second portions alternatingly spaced between said first portions, said second portions extending away from the other elongated member for a distance sufficient to accomodate one of said fixed rings on said neck chains, said plurality of portions being sufficient to accomodate 2, 3 or 4 neck chain fixed rings.

12. The device of claim 11 wherein first portions of said member normally are in light contact with the other elongated member.

13. The device of claim 11 wherein one of said elongated members is divergent from the other member at its end away from the biasing means.

14. The device of claim 11 wherein said flexible metal is plated with a precious metal.

* * * * *